US010920696B2

(12) United States Patent
Imai et al.

(10) Patent No.: US 10,920,696 B2
(45) Date of Patent: Feb. 16, 2021

(54) ENGINE CONTROLLER AND ENGINE CONTROLLING METHOD (71) Applicant: TOYOTA JIDOSHA KABUSHIKI KAISHA, Toyota (JP)

(72) Inventors: Sohichi Imai, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/358,830

(22) Filed: Mar. 20, 2019

(65) Prior Publication Data
US 2019/0316535 A1 Oct. 17, 2019

(30) Foreign Application Priority Data

Apr. 11, 2018 (JP) .............................. JP2018-076114

(51) Int. Cl.
F02D 41/06 (2006.01)
F02D 41/00 (2006.01)
(Continued)

(52) U.S. Cl.
CPC ....... F02D 41/061 (2013.01); F02D 41/0052 (2013.01); F02D 41/144 (2013.01);
(Continued)

(58) Field of Classification Search
CPC .. F02D 41/061; F02D 41/0052; F02D 41/144; F02D 41/1441; F02D 41/1454; F02D 2041/0265; F02D 41/0085; F02D 41/0235; F02D 41/0255; F02D 41/40; F02D 43/04; F02D 37/02; F02D 41/30;
(Continued)

(56) References Cited

U.S. PATENT DOCUMENTS 5,001,645 A * 3/1991 Williams ............ F02D 41/0047
123/406.2
5,157,613 A * 10/1992 Williams ............... F02D 41/005
123/406.23

(Continued)

FOREIGN PATENT DOCUMENTS

CN 101668943 A 3/2010
CN 102052173 A 5/2011
(Continued)

Primary Examiner — Joseph J Dallo
(74) Attorney, Agent, or Firm — Oblon, McClelland, Maier & Neustadt, L.L.P.

(57) ABSTRACT

An electronic control unit performs a cylinder-by-cylinder correction of a fuel injection amount to cause differences among air-fuel ratios of air-fuel mixture burned in multiple cylinders. In a case in which the cylinder-by-cylinder correction of the fuel injection amount results in a cylinder in which combustion is performed at an air-fuel ratio richer than an output air-fuel ratio, the output air-fuel ratio being an air-fuel ratio at which combustion torque is maximized, the electronic control unit performs a cylinder-by-cylinder correction of ignition timing such that the ignition timing of the cylinder in which combustion is performed at the air-fuel ratio richer than the output air-fuel ratio becomes more advanced than the ignition timing of the other cylinders.

11 Claims, 3 Drawing Sheets (51) Int. Cl.
*F02D 41/14* (2006.01)
*F02P 5/15* (2006.01)
*F02P 9/00* (2006.01)

(52) U.S. Cl.
CPC ..... *F02D 41/1441* (2013.01); *F02D 41/1454* (2013.01); *F02P 5/1512* (2013.01); *F02P 9/002* (2013.01)

(58) Field of Classification Search
CPC .. F02D 41/1475; F02D 41/008; F02D 41/024; F02P 5/1512; F02P 9/002; F02P 5/151; F02P 5/045; F02P 5/1522
See application file for complete search history.

(56) References Cited

U.S. PATENT DOCUMENTS

| | | | |
|---|---|---|---|
| 5,315,823 A | | 5/1994 | Nishikawa et al. |
| 5,540,205 A | * | 7/1996 | Davis ............... F02D 43/00 |
| | | | 123/486 |
| 5,755,205 A | | 5/1998 | Nishimura et al. |
| 5,758,493 A | * | 6/1998 | Asik ............... B01D 53/9431 |
| | | | 123/443 |
| 5,867,983 A | * | 2/1999 | Otani ............... F02D 37/02 |
| | | | 123/406.23 |
| 2004/0250534 A1 | | 12/2004 | Tanaka et al. |
| 2008/0035132 A1 | | 2/2008 | Katoh et al. |
| 2009/0210134 A1 | * | 8/2009 | Miyata ............... F02D 41/1454 |
| | | | 701/103 |
| 2012/0006307 A1 | | 1/2012 | Demura |
| 2016/0123257 A1 | | 5/2016 | McEwan |
| 2017/0314482 A1 | * | 11/2017 | Nakagawa ............... F02D 37/02 |

FOREIGN PATENT DOCUMENTS

| | | |
|---|---|---|
| CN | 102099557 A | 6/2011 |
| DE | 10 2004 051 651 A1 | 5/2006 |
| DE | 11 2009 004 382 T5 | 6/2012 |
| DE | 10 2015 118 462 A1 | 5/2016 |
| JP | 11-287145 | 10/1999 |
| JP | 2004-108204 | 4/2004 |
| JP | 2004-353552 | 12/2004 |
| JP | 2005023806 A * | 1/2005 |
| JP | 2010-168949 | 8/2010 |
| JP | 2016-084732 | 5/2016 |

* cited by examiner

ENGINE CONTROLLER AND ENGINE CONTROLLING METHOD

BACKGROUND

1. Field

The following description relates to an engine controller and an engine controlling method configured to perform a cylinder-by-cylinder correction of a fuel injection amount so as to cause differences among air-fuel ratios of air-fuel mixture burned in multiple cylinders.

2. Description of Related Art

A typical engine controller operates an engine while causing differences among the air-fuel ratios of air-fuel mixture burned in the cylinders through a cylinder-by-cylinder correction of the fuel injection amount. For example, a typical engine controller s configured to compensate for steady air-fuel ratio deviations caused by fluctuations of the intensity of exhaust gas blow on the air-fuel sensor from the respective cylinders through a cylinder-by-cylinder correction of the fuel injection amount. Additionally, the cylinder-by-cylinder correction of the fuel injection amount may be performed in order to suppress an excessive temperature rise of a catalyst device installed in the exhaust passage or to promote a temperature rise of the catalyst device.

Recently, the fuel economy performance of on-board engines has become important. Thus, there is room for improvement in the fuel economy performance of an engine during the execution of a cylinder-by-cylinder correction of the fuel injection amount.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, an engine controller that includes a fuel injection corrector is provided. The fuel injection corrector is configured to perform a cylinder-by-cylinder correction of a fuel injection amount so as to cause differences among air-fuel ratios of air-fuel mixture burned in a plurality of cylinders. In a case in which the cylinder-by-cylinder correction of the fuel injection amount results in a cylinder in which combustion is performed at an air-fuel ratio richer than an output air-fuel ratio, the output air-fuel ratio being an air-fuel ratio at which combustion torque is maximized, the fuel injection corrector is configured to perform a cylinder-by-cylinder correction of ignition timing such that the ignition timing of the cylinder n which combustion is performed at the air-fuel ratio richer than the output air-fuel ratio becomes more advanced than the ignition timing of other cylinders.

In a second general aspect, an engine controller that includes a fuel injection corrector is provided. The fuel injection corrector is configured to perform a cylinder-by-cylinder correction of a fuel injection amount so as to cause differences among air-fuel ratios of air-fuel mixture burned in a plurality of cylinders. The fuel injection corrector includes circuitry that is configured such that, in a case in which the cylinder-by-cylinder correction of the fuel injection amount results in a cylinder in which combustion is performed at an air-fuel ratio richer than an output air-fuel ratio, the output air-fuel ratio being an air-fuel ratio at which combustion torque is maximized, the circuitry performs a cylinder-by-cylinder correction of ignition timing such that the ignition timing of the cylinder in which combustion is performed at the air-fuel ratio richer than the output air-fuel ratio becomes more advanced than the ignition timing of other cylinders.

In a third general aspect, an engine controlling method is provided that includes: performing a cylinder-by-cylinder correction of a fuel injection amount so as to cause differences among air-fuel ratios of air-fuel mixture burned in a plurality of cylinders; and in a case in which the cylinder-by-cylinder correction of the fuel injection amount results in a cylinder in which combustion is performed at an air-fuel ratio richer than an output air-fuel ratio, which is an air-fuel ratio at which combustion torque is maximized, performing a cylinder-by-cylinder correction of ignition timing such that the ignition timing of the cylinder in which combustion is performed at the air-fuel ratio richer than the output air-fuel ratio becomes more advanced than the ignition timing of other cylinders.

Accordingly the above embodiments provide an engine controller and an engine controlling method capable of limiting a decrease in engine output efficiency due to a cylinder-by-cylinder correction of fuel injection amount.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An engine controller according to an embodiment will now be described with reference to FIGS. 1 to 5. In the present embodiment, the engine controller serves as a fuel injection controller (or, fuel injection corrector).

Figure 1:
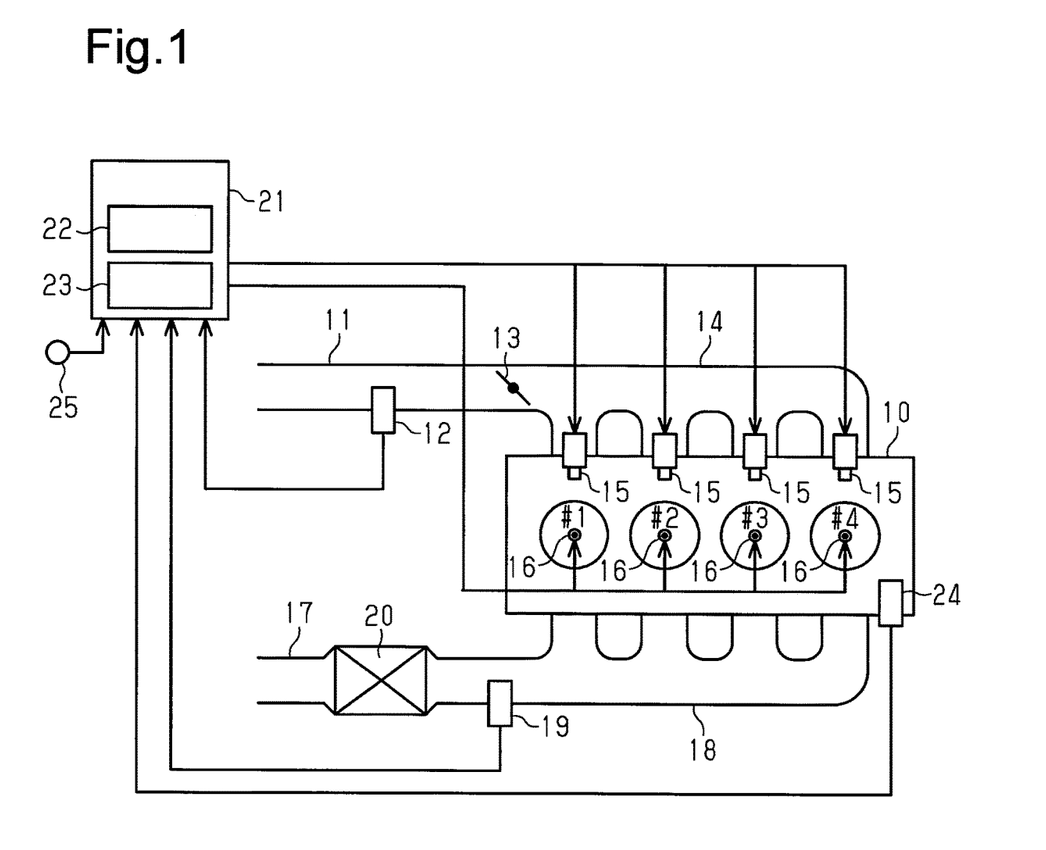
FIG. 1 is a schematic diagram showing the configuration of an engine controller according to an embodiment.

As shown in FIG. 1, an engine 10 is an inline four-cylinder engine, which includes inline four cylinders #1 to #4. The engine 10 includes an intake passage 11 provided with an air flow meter 12 and a throttle valve 13. The air flow meter 12 detects the flow rate of intake air (intake air amount) flowing through the intake passage 11. The throttle valve 13 adjusts an intake air amount GA of the intake passage 11. The intake passage 11 is connected to an intake manifold 14 on the downstream side of the throttle valve 13. The intake manifold 14 is a branched tube for diverting the intake air for the respective cylinders. The engine 10 includes fuel injection valves 15 for injecting fuel into intake air diverted for the respective cylinder by the intake manifold 14. Each of the cylinders #1 to #4 is provided with a fuel injection valve 15 and an ignition plug 16. The ignition plug 16 ignites, with spark discharge, air-fuel mixture of the intake air drawn in through the intake passage 11 and the fuel injected by the fuel injection valve 15.

The engine 10 is provided with an exhaust passage 17 having an exhaust manifold 18. The exhaust manifold 18 is a collecting pipe that collects the exhaust gas of the cylinders #1 to #4. An air-fuel ratio sensor 19 for detecting the air-fuel ratio of the air-fuel mixture burned in the cylinders #1 to #4 is provided on the downstream side of the exhaust manifold 18 in the exhaust passage 17. Furthermore, a catalyst device 20 for purifying exhaust gas is installed on the downstream side of the air-fuel ratio sensor 19 in the exhaust passage 17. As the catalyst device 20, a three-way catalyst device is employed that is capable of most effectively purifying exhaust gas when air-fuel mixture is burned in each of the cylinders #1 to #4 at the stoichiometric air fuel ratio.

An electronic control unit 21, which serves as an engine controller for controlling the engine 10, is a microcomputer including an arithmetic processing circuit 22 and a memory 23. The electronic control unit 21 receives detection signals from the air flow meter 12 and the air-fuel ratio sensor 19. The electronic control unit 21 also receives detection signals from a crank angle sensor 24, which outputs a pulse signal each time the crankshaft, or the output shaft of the engine 10, rotates by a predetermined angle, and an accelerator pedal sensor 25, which detects the depression amount of the accelerator pedal by the driver. The electronic control unit 21 causes the arithmetic processing circuit 22 to read various programs for engine control stored in the memory 23 in advance and execute the programs, thereby controlling the operation state of the engine 10. As one of such processes, the electronic control unit 21 calculates the engine speed from the pulse signals of the crank angle sensor 24.

The electronic control unit 21 controls the amount of fuel injected by the fuel injection valves 15 of the cylinders #1 to #4 (fuel injection amount) as part of the engine control. At that time, the electronic control unit 21 calculates the fuel injection amount of each of the cylinders #1 to #4 based on the following expression (1). In the present specification and drawings, in a parameter set for the respective cylinders, the number of the corresponding cylinder is placed in square brackets added to the end of a symbol. For example, a fuel injection amount Q[1] represents the fuel injection amount of the cylinder #1, and a fuel injection amount Q[2] represents the fuel injection amount of cylinder #2. Further, when "i" is placed in the square brackets that are added to the end of the symbol, the parameter is represented as a parameter of an arbitrary cylinder out of the cylinders #1 to #4. The letter "i" represents any of 1, 2, 3, and 4.

$$Q[i]=QBSE \times FAF \times KG \times (1+A[i]+B[i]+C[i]+D[i]) \quad (1)$$

QBSE represents a base injection amount, which is a calculated value of the fuel injection amount necessary for burning the air-fuel mixture in each cylinder at the stoichiometric air-fuel ratio. The base injection amount QBSE is calculated by dividing the mass of the air flowing into each of the cylinders #1 to #4 (cylinder intake air amount) by the stoichiometric air-fuel ratio. FAF represents an air-fuel ratio feedback correction value, and KG represents an air-fuel ratio learning value. A[i], B[i], C[i], and D[i] represent cylinder-by-cylinder correction values, which are set for the respective cylinders.

Intake Air Distribution Correction Value

An intake air distribution correction value A[i] is a cylinder-by-cylinder correction value for the fuel injection amount for compensating for deviations of the air-fuel ratio among the cylinders due to variation in intake air distribution of the intake manifold 14. The variation in intake air distribution among the cylinders for each operation region of the engine 10 is measured when engine 10 is engineered (designed). That is, the cylinder-by-cylinder correction value for compensating for deviations of the air-fuel ratio due to the variation in intake air distribution is obtained in advance from the measurement testing results during the engineering of the engine. The memory 23 stores, in a map, the intake air distribution correction value A[i] of each of the cylinders #1 to #4 for each operation region of the engine 10. The electronic control unit 21 calculates the intake air distribution correction value A[i] of each of the cylinders #1 to #4 with reference to the map.

Gas-Blow Correction Value

There are individual differences in injection characteristics of the fuel injection valve 15. For this reason, even when injection of the same amount of fuel to each cylinder is instructed, there occurs variation in amount of actual injected fuel. Further, the intensity of exhaust gas blowing against the air-fuel ratio sensor 19 differs depending on the cylinder. For example, the result of the combustion is more likely to be reflected on the air-fuel ratio feedback correction value FAF in a cylinder of a greater intensity of exhaust gas blow. Specifically, there may be case in which a fuel injection valve 15 that injects fuel in a larger amount than an instructed amount is installed in a cylinder with an intense gas blow. In this case, the detection result of the exhaust air-fuel ratio of the air-fuel ratio sensor 19 tends to show a richer value than the average value of the air-fuel ratios of the cylinders #1 to #4. If feedback control of the air-fuel ratio is performed in accordance with this detection result, the air-fuel ratio of the engine 10 regularly deviates to the leaner side. Thus, as described, the differences in the intensity of exhaust gas blowing against the air-fuel ratio sensor 19 among the cylinders cause a regular deviation of the air-fuel ratio with respect to the target air-fuel ratio.

The gas-blow correction value B[i] is a cylinder-by-cylinder correction value for the fuel injection amount for preventing a regular deviation of the air-fuel ratio that occurs due to differences in gas blow intensity among the cylinders. The memory 23 stores in a map the gas-blow correction value B[i] of each of the cylinders #1 to #4 for each operation region of the engine 10. The electronic control unit 21 calculates the gas-blow correcting value B[i] of each of the cylinders #1 to #4 with reference to the map. The gas-blow correction values B[i] of the cylinders #1 to #4 are set such that the actual air-fuel ratio of the cylinder with the most intense gas blow is the stoichiometric air-fuel ratio and that the total of the gas-blow correction values B[i] of the cylinders #1 to #4 is zero. For example, when there is a tendency that the air-fuel ratio of the cylinder with the most intense gas blow deviates to the lean side, a gas-blow correction value B[i] for increasing the fuel injection amount is set for that cylinder, and a gas-blow correction value B[i] for decreasing the fuel injection amount is set for each of the remaining cylinders. In contrast, when there is a tendency that the air-fuel ratio of the cylinder with the most intense gas blow deviates to the rich side, a gas-blow correction value B[i] for decreasing the fuel injection amount is set for that cylinder, and a gas-blow correction value B[i] for increasing the fuel injection amount is set for each of the remaining cylinders. The cylinder-by-cylinder correction of the fuel injection amount is made using the gas-blow correction value B[i], so that the regular deviation of the air-fuel ratio is prevented by causing differences among the air-fuel ratios of the cylinders #1 to #4 in accordance with the gas blow intensities.

Overheat Prevention Correction Value for Catalyst Device

Erosion of the catalyst device 20 due to overheating is prevented by discharging exhaust gas containing a large amount of unburned fuel due to rich combustion, in which the air-fuel ratio is made richer than the stoichiometric air-fuel ratio, to the exhaust passage 17 and decreasing the temperature of the exhaust gas by the heat of evaporation of the unburned fuel. However, when rich combustion is performed in all of the cylinders #1 to #4 of the engine 10, the exhaust gas purification efficiency in the catalyst device 20 deteriorates. Thus, in the present embodiment, in the overheat prevention control that is performed when the temperature of the catalyst device 20 exceeds a preset value, the rich combustion is performed only in some of the cylinders. This limits the temperature rise of the catalyst device 20 while preventing deterioration of the exhaust gas purification efficiency.

When the length of the exhaust flow channel from the cylinder to the catalyst device 20 is longer, the unburned fuel is more readily vaporized, and the exhaust gas cooling efficiency becomes greater. Among the cylinders #1 to #4 of the engine 10 of the present embodiment, the cylinder #4 is the cylinder with the longest exhaust flow channel to the catalyst device 20. Therefore, in the overheat prevention control for the catalyst device 20, the rich combustion is performed in the cylinder #4 in the present embodiment.

The overheat prevention correction value C[i] is a cylinder-by-cylinder correction value for the fuel injection amount for limiting temperature rise of the catalyst device 20 in the overheat prevention control. When the estimated temperature of the catalyst device 20 is lower than or equal to the preset value, the overheat prevention correction value C[i] is set to zero in any of the cylinders #1 to #4. In contrast, when the temperature of the catalyst device 20 exceeds the preset value, the overheat prevention correction value C[4] of the cylinder #4 is set to a positive value, and the overheat prevention correction values C[1], C[2], and C[3] of the remaining cylinders #1 to #3 are set to 0 (C[1], C[2], C[3]=0, C[4]>0). The higher the temperature of the catalyst device 20 beyond the preset value, the larger the overheat prevention correction value C[4] of the cylinder #4 becomes.

Dither Control Correction Value

In the fuel injection controller of the present embodiment, a dither control for promoting warm-up of the catalyst device 20 is performed immediately after cold start of the engine 10. In the dither control, rich combustion is performed in some of the cylinders #1 to #4, and the lean combustion is performed in the remaining cylinders. The catalyst device 20 is brought into an excess oxygen state by exhaust gas containing a large amount of excess oxygen in the cylinders in which lean combustion has been performed, and temperature rise of the catalyst device 20 is promoted by delivering and burning exhaust gas containing a large amount of unburned fuel that has been subjected to rich combustion.

The dither control is carried out through the correction of the fuel injection amount for the respective cylinders by using the dither control correction value D[i]. In the present embodiment, rich combustion is performed in the cylinder #1, and the lean combustion is performed in the remaining cylinders #2 to #4. Except the time of execution of the dither control, the dither control correction values D[i] of the respective cylinders #1 to #4 are all set to 0. At the time of execution of the dither control, the dither control correction value D[1] of the cylinder #1, in which rich combustion is performed, is set to a dither width $\Delta$, which is a preset positive value. Further, dither control correction values D[2], D[3], D[4] of the remaining cylinders #2 to #4, in which lean combustion is performed, are set to a value $(-\Delta/3)$ obtained by dividing the dither width $\Delta$ by 3 and inverting the positive/negative of the obtained value. The total of the dither control correction values D[i], which are set in the above described manner, is 0.

Out of the four cylinder-by-cylinder correction values, the gas-blow correction value B[i], the overheat prevention correction value C[i], and the dither control correction value D[i] are cylinder-by-cylinder correction values for the fuel injection amount for causing differences among the air-fuel ratios of the cylinders #1 to #4. In contrast, the intake air distribution correction value A[i] is a cylinder-by-cylinder correction value for compensating for the variation in air-fuel ratio among the cylinders due to the variation in the intake air distribution. That is, the intake air distribution correction value A[i] is different from the other three cylinder-by-cylinder correction values in that it does not cause differences among the air-fuel ratios of the cylinders #1 to #4.

The electronic control unit 21 calculates the air-fuel ratio of the air-fuel mixture burned in each of the cylinders #1 to #4 based on the results of the cylinder-by-cylinder corrections of the fuel injection amount. The calculated values of the air-fuel ratios of the cylinder #1 to #4 (air-fuel ratio calculated value ABYF[i]) are obtained in the following manner. Among the correction values used to calculate the fuel injection amounts Q[i] of the cylinders #1 to #4, the air-fuel ratio feedback correction value FAF, the air-fuel ratio learning value KG, and the intake air distribution correction value A[i] are correction values for compensating for deviations of the air-fuel ratio with respect to the stoichiometric air-fuel ratio.

In contrast, the gas-blow correction value B[i], the overheat prevention correction value C[i], and the dither control correction value D[i] are correction values for deviating the air-fuel ratio from the stoichiometric air-fuel ratio.

Therefore, the value obtained by applying only the former correction value to the base injection amount QBSE is the fuel injection amount for setting the air-fuel ratio to the stoichiometric air-fuel ratio. Based on this, the electronic control unit 21 obtains the air-fuel ratio calculated value ABYF[i] of the cylinders #1 to #4 as a value satisfying the relationship of the following expression (2).

$$ABYF[i] = \frac{Q[i]}{QBSE \times FAF \times KG \times (1 + A[i])} \times [\text{Stoichiometric Air Fuel Ratio}] \quad (2)$$

Cylinder-by-Cylinder Correction of Ignition Timing

In addition to the above-described control of the fuel injection amount, the electronic control unit 21 also controls the ignition timing of the ignition plugs 16 of the cylinders #1 to #4. In the ignition timing control, the electronic control unit 21 first calculates a final ignition timing IG, which is a target value of the common ignition timing for the cylinders when the cylinder-by-cylinder correction of the fuel injection amount is not being performed. The value of the final ignition timing IG represents the advanced amount of the crank angle from the compression top dead center of each of the cylinders #1 to #4.

The final ignition timing IG is determined based on the optimum ignition timing and the trace knock ignition timing. The optimum ignition timing is the ignition timing at which the torque generated by the combustion of the air-fuel mixture in the cylinder (hereinafter, referred to as combustion torque) is maximized. The trace knock ignition timing is the advance limit of the ignition timing that can suppress the occurrence of knocking. The electronic control unit 21 calculates the optimum ignition timing and the trace knock ignition timing based on the operating state (the engine speed, the engine load, and the like) of the engine 10. The electronic control unit 21 calculates, as the trace knock ignition timing, the timing at which the advance limit is reached when the air-fuel ratio is the stoichiometric air-fuel ratio.

Figure 2:
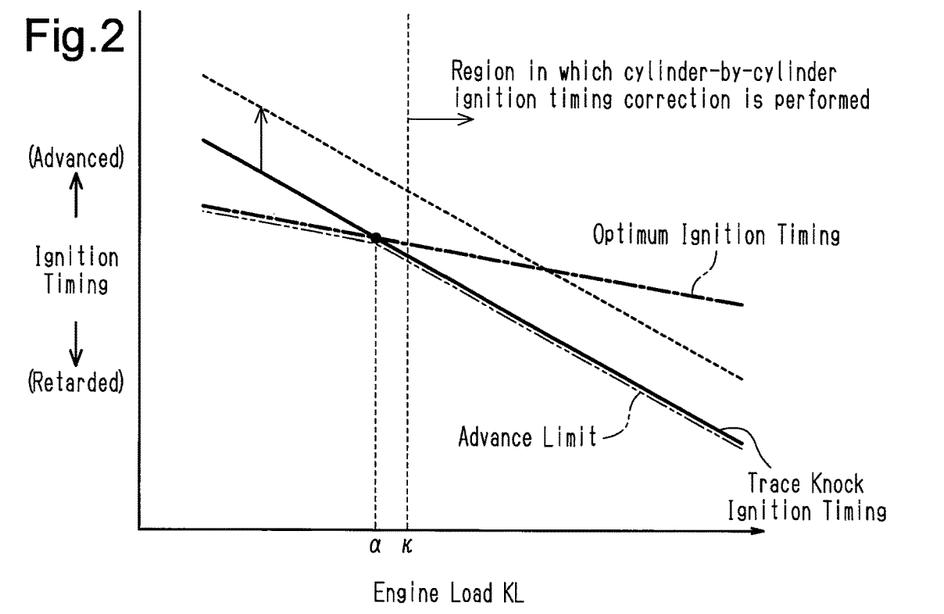
FIG. 2 is a graph showing the relationship between optimum ignition timing and trace knock ignition timing.

FIG. 2 shows the relationship of the engine load KL with the optimum ignition timing and the trace knock ignition timing. As shown in FIG. 2, the optimum ignition timing and the trace knock ignition timing are gradually retarded as the engine load KL increases. In the region where the engine load KL is lower than α in the drawing, the optimum ignition timing is more retarded than the trace knock ignition timing, and the ignition timing can be advanced to the optimum ignition timing. In contrast, in the region where the engine load exceeds α, the trace knock ignition timing is more retarded than the optimum ignition timing, and the trace knock ignition timing is the advance limit of the ignition timing. Thus, when determining the final ignition timing 1G, the electronic control unit 21 first sets the limit ignition timing to the more retarded one of the optimum ignition timing and the trace knock ignition timing. The electronic control unit 21 calculates the value of the final ignition timing IG as a value obtained by retarding the set limit ignition timing through various corrections in accordance with the operating state of the engine 10.

The electronic control unit 21 also corrects the final ignition timings IG for the respective cylinders and obtains cylinder-by-cylinder final ignition timings IG[i], which are target values of the ignition timings of the respective cylinders. Then, the electronic control unit 21 controls the ignition timings of the ignition plugs 16 of the cylinders #1 to #4 in accordance with the cylinder-by-cylinder final ignition timings IG[i].

Figure 3:
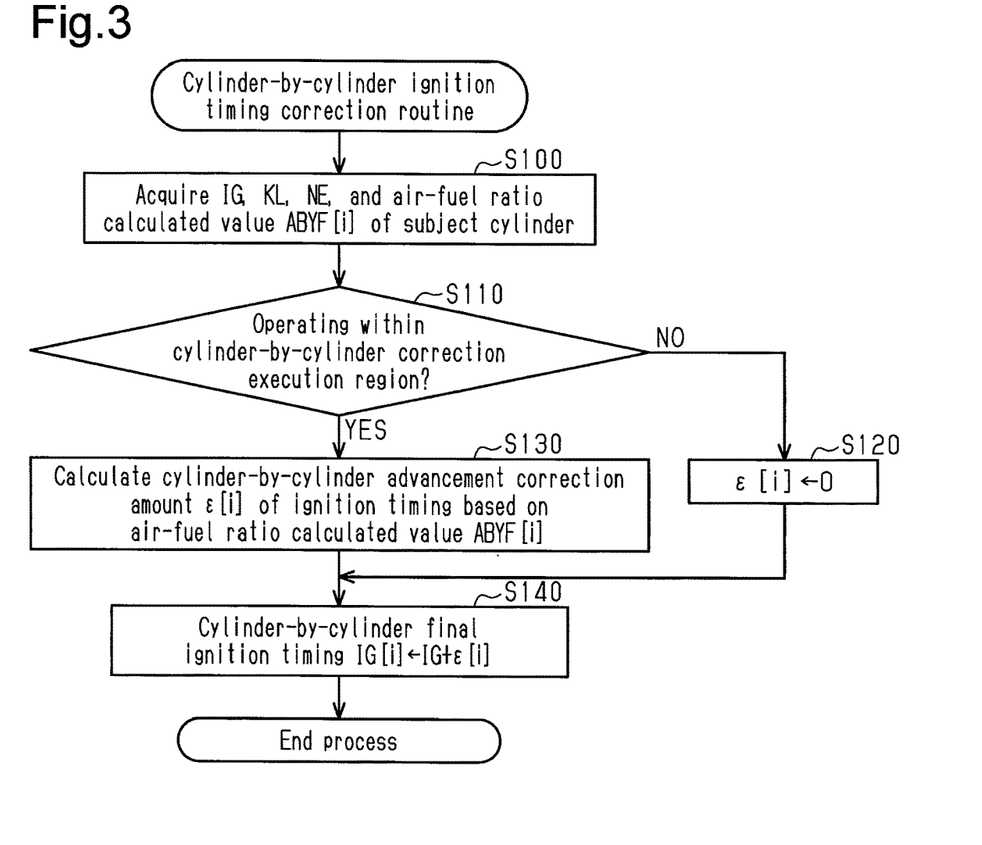
FIG. 3 shows a flowchart of a cylinder-by-cylinder ignition timing correction routine executed by the engine controller.

FIG. 3 shows the processing procedure of the cylinder-by-cylinder ignition timing correction routine of the cylinder-by-cylinder correction of the ignition timing. The processing of this routine is carried out individually for each cylinder in determining the ignition timing of each of the cylinders #1 to #4. In the following description, the cylinder to be subjected to this routine is referred to as a subject cylinder.

When the processing of this routine is started, the final ignition timing IG, the engine load KL, the engine speed NE, and the air-fuel ratio calculated value ABYF[i] of the subject cylinder are acquired in step S100.

Subsequently, in step S110, it is determined whether the engine 10 is operating within a cylinder-by-cylinder correction execution region of the ignition timing based on the engine speed NE and the engine load KL. In the cylinder-by-cylinder correction execution region, an engine operation region is set in which the trace knock ignition timing is more retarded than optimum ignition timing. In the present embodiment, a region where the engine load KL is greater than κ shown in FIG. 2 is defined as the cylinder-by-cylinder correction execution region. κ is a value slightly greater than the value a of the engine load KL at which the trace knock ignition timing coincides with the optimum ignition timing.

If the engine 10 is not operating within the cylinder-by-cylinder correction execution region (S110: NO), a cylinder-by-cylinder advancement correction amount E[i] of the subject cylinder is set to 0, and the process proceeds to Step S140. In contrast, if the engine 10 is operating within the cylinder-by-cylinder correction execution region (S110: YES), the cylinder-by-cylinder advancement correction amount E[i] is calculated based on the air-fuel ratio calculated value ABYF[i] of the subject cylinder in step S130. The process then proceeds to step S140. In step S140, the cylinder-by-cylinder final ignition timing IG[i] of the subject cylinder is set to a timing obtained by advancing the final ignition timing IG by the cylinder-by-cylinder advancement correction amount E[i]. Thereafter, the process of the current routine is ended.

Figure 4:
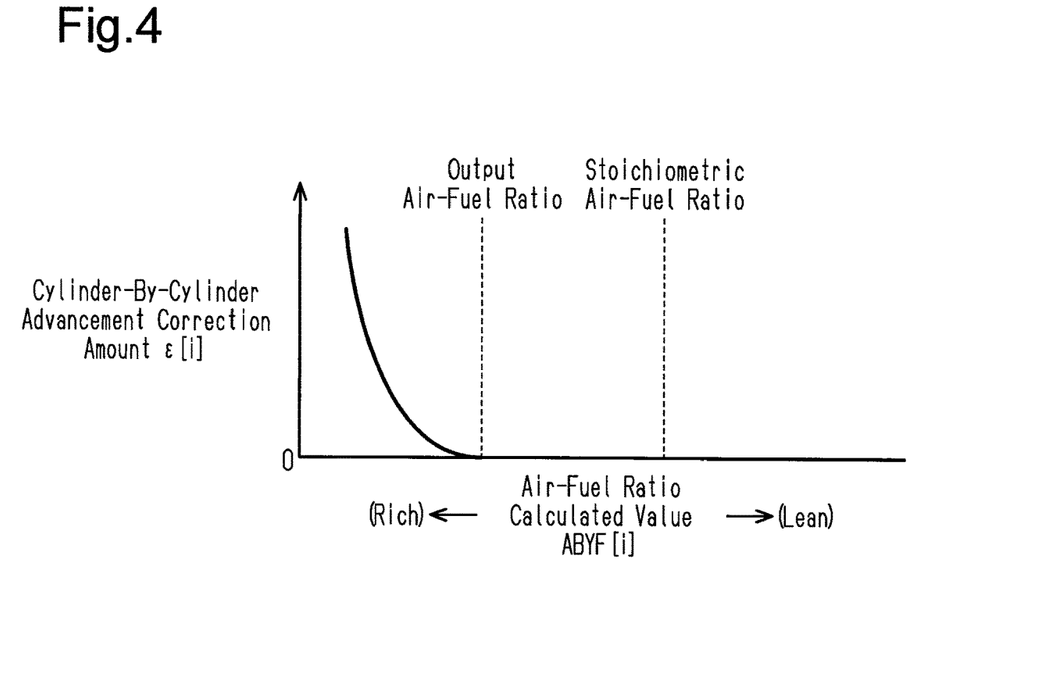
FIG. 4 is a graph showing the relationship between the air-fuel ratio and the cylinder-by-cylinder advancement correction amount.

FIG. 4 shows the relationship between the calculated value of the cylinder-by-cylinder advancement correction amount E[i] and the air-fuel ratio calculated value ABYF[i] in step S130. FIG. 4 shows an output air-fuel ratio that is an air-fuel ratio at which the combustion torque is the maximum and is richer than the stoichiometric air-fuel ratio. In step S130, the cylinder-by-cylinder advancement correction amount ε[i] of the subject cylinder is set to 0 if the air-fuel ratio calculated value ABYF[i] of the subject cylinder is leaner than the output air-fuel ratio, that is, if the combustion in the subject cylinder is performed at an air-fuel ratio leaner than the output air-fuel ratio. If the air-fuel ratio calculated value ABYF[i] of the subject cylinder is richer than the output air-fuel ratio, that is, if the combustion in the subject cylinder is performed at an air-fuel ratio richer than the output air-fuel ratio, the cylinder-by-cylinder advancement correction amount ε[i] of the subject cylinder is set to a value that changes in accordance with the air-fuel ratio calculated value ABYF[i] in the following manner. That is, when the air-fuel ratio calculated value ABYF[i] changes from the output air-fuel ratio to a richer value, the air-fuel ratio calculated value ABYF[i] is set to be gradually increased from the value at the time of the output air-fuel ratio (0).

The operation and advantages of the present embodiment will now be described.

The engine controller of the present embodiment performs the cylinder-by-cylinder correction of the fuel injection amount to cause differences among the air-fuel ratios of air-fuel mixture burned in multiple cylinders. Accordingly, combustion may be performed at an air-fuel ratio different from the stoichiometric air-fuel ratio.

Figure 5:
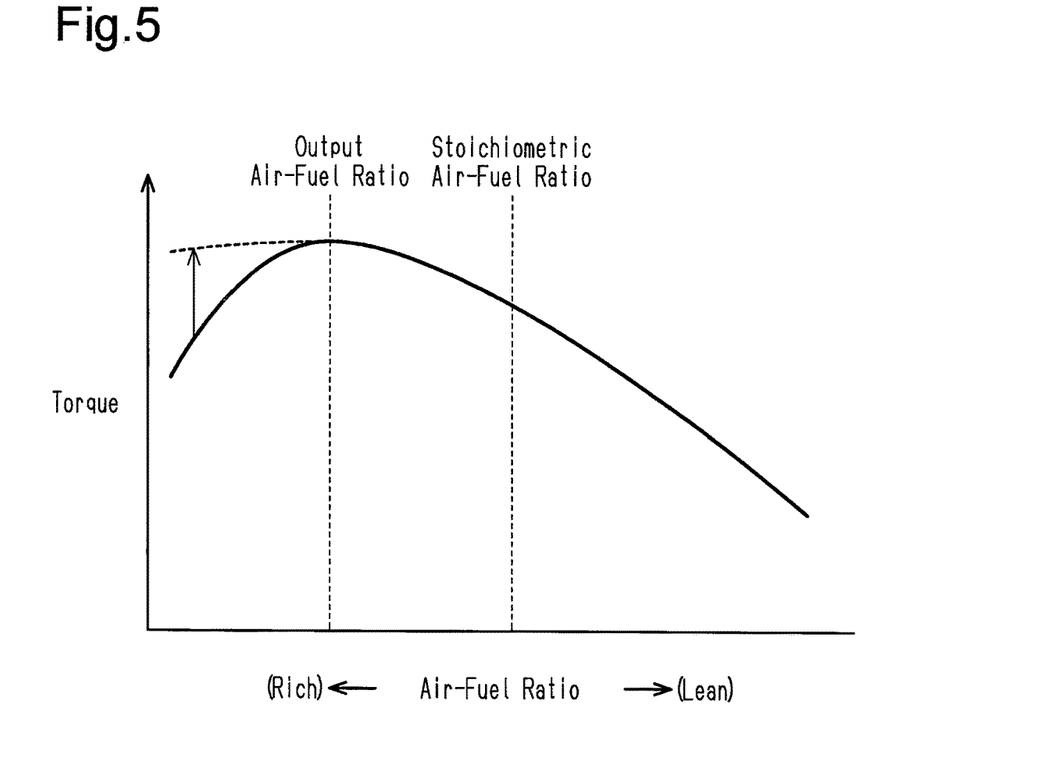
FIG. 5 is a graph showing the relationship between the air-fuel ratio and the torque.

As shown in FIG. 5, when the cylinder intake air amount is constant, the combustion torque of each cylinder is the maximum at an output air-fuel ratio richer than the stoichiometric air-fuel ratio, and the combustion torque decreases as the air-fuel ratio is separated away from that output air-fuel ratio. Also, when the cylinder intake air amount is constant, the richer the air-fuel ratio, the greater the fuel injection amount becomes. Thus, if the air-fuel ratio is richer than the output air-fuel ratio, the torque generation efficiency deteriorates significantly. Therefore, in the medium and high load operation ranges of the engine 10, in which output efficiency is required, combustion at an air-fuel ratio richer than the output air-fuel ratio is not desirable even in part of the cylinders. However, the engine controller of the present embodiment separately calculates the gas-blow correction value B[i], the overheat prevention correction value C[i], and the dither control correction value D[i], and may perform combustion at an air-fuel ratio richer than the output air-fuel ratio depending on the situation.

In contrast, when combustion is performed at an air-fuel ratio richer than the output air-fuel ratio, the latent heat of vaporization of the fuel is relatively large and the in-cylinder temperature is lowered, so that knocking is unlikely to occur. That is, as indicated by the broken line in FIG. 2, the actual trace knock ignition timing when combustion is performed at an air-fuel ratio richer than the output air-fuel ratio is more advanced than that when combustion is performed at the stoichiometric air-fuel ratio (advanced timing). In the region where the engine load KL is greater than or equal to κ in FIG. 2, such advancement of the trace knock ignition timing allows the ignition timing to be advanced beyond the limit ignition timing.

In the present embodiment, the cylinder-by-cylinder correction is performed such that the ignition timing of the cylinder in which combustion is performed at an air-fuel ratio richer than the output air-fuel ratio is more advanced than the ignition timings of the other cylinders. This increases the torque generated in the cylinder in which combustion is performed at an air-fuel ratio richer than the output air-fuel ratio as indicated by the broken line in FIG. 5. As a result, the output efficiency of the engine 10 is prevented from being lowered when the cylinder-by-cylinder correction of the fuel injection amount results in a cylinder in which combustion is performed at an air-fuel ratio richer than the output air-fuel ratio.

In the present embodiment, three correction values, or the gas-blow correction value B[i], the overheat prevention correction value C[i], and the dither control correction value D[i] are used as cylinder-by-cylinder correction values for the fuel injection amount for causing differences among the air-fuel ratios in the cylinders. Among these correction values, the gas-blow correction value B[i] and the dither control correction value D[i] are determined such that the sum of the correction values for the cylinders #1 to #4 is zero. Accordingly, when there is no possibility of overheating of the catalyst device 20 and the overheat prevention correction values C[i] of the cylinders #1 to #4 are all 0, the cylinder-by-cylinder correction of the fuel injection amount is performed such that the air-fuel ratio of the entire engine 10, that is, the air-fuel ratio of the total of the air-fuel mixture burned in all the cylinders #1 to #4 is the stoichiometric air-fuel ratio. The exhaust gas of all the cylinders #1 to #4 flows into the catalyst device 20 in a mixed state. Thus, the components of the exhaust gas flowing into the catalyst device 20 are substantially the same as those in a case in which combustion in the cylinders #1 to #4 is performed at the stoichiometric air-fuel ratio. Therefore, in this case, it is possible to perform the cylinder-by-cylinder correction of the fuel injection amount while suppressing deterioration of the exhaust purification performance.

The cylinder in which the air-fuel ratio has become richer than the stoichiometric air-fuel ratio and the cylinder in which the air-fuel ratio has become leaner than the stoichiometric air-fuel ratio as a result of the cylinder-by-cylinder correction of the fuel injection amount will be referred to as a rich combustion cylinder and a lean combustion cylinder, respectively. When the air-fuel ratio of the entire engine 10 is set to the stoichiometric air-fuel ratio, increase of the differences among the air-fuel ratios of the cylinders makes the air-fuel ratio of the lean combustion cylinder leaner and the air-fuel ratio of the rich combustion cylinder richer. When the air-fuel ratio of the lean combustion cylinder is made leaner from the stoichiometric air-fuel ratio, the torque generated in the lean combustion cylinder decreases. In contrast, when the air-fuel ratio of the rich combustion cylinder is made richer from the stoichiometric air-fuel ratio, the torque generated in the rich combustion cylinder increases until the air-fuel ratio reaches the output air-fuel ratio. Thus, when the air-fuel ratio of the rich combustion cylinder is leaner than the output air-fuel ratio, the decrease in the torque generated in the lean combustion cylinder is compensated for by the increase of the torque generated in the rich combustion cylinder without performing the cylinder-by-cylinder correction of the ignition timing. This limits the reduction of the engine torque as the result of the cylinder-by-cylinder correction of the fuel injection amount.

However, when the air-fuel ratio of the rich combustion cylinder is made richer beyond the output air-fuel ratio, the torque generated in the rich combustion cylinder decreases. Therefore, without the cylinder-by-cylinder correction of the ignition timing, the decrease in the torque generated in the lean combustion cylinder cannot be sufficiently compensated for by the increase in the torque generated in the rich combustion cylinder. For this reason, the engine torque may be greatly reduced as a result of the cylinder-by-cylinder correction of the fuel injection amount. To cope with this situation, the present embodiment performs the cylinder-by-cylinder correction of the ignition timing to increase the torque generated in the cylinder in which combustion is performed at an air-fuel ratio richer than the output air-fuel ratio. This limits a decrease in the engine torque when the air-fuel ratio of the rich combustion cylinder becomes richer than the output air-fuel ratio.

The present embodiment may be modified as follows. The present embodiment and the following modifications can be combined as long as the combined modifications remain technically consistent with each other.

Similarly to the gas-blow correction value B[i] and the dither control correction value D[i], the overheat prevention correction value C[i] may be set such that the sum of the values of the cylinders #1 to #4 becomes zero. In this case, it is possible to limit deterioration of the exhaust purification performance even during execution of the overheat prevention correction.

In the above-described embodiment, the cylinder-by-cylinder correction of the ignition timing is performed by correcting the final ignition timing IG with the cylinder-by-cylinder advancement correction amount ε[i]. The cylinder-by-cylinder correction of the ignition timing may be performed by correcting the trace knock ignition timing with the cylinder-by-cylinder advancement correction amount ε[i]. In the above-described embodiment, the cylinder-bycylinder correction of the ignition timing is performed only in the operation region in which the trace knock ignition timing in the state where the fuel injection amount is not subjected to the cylinder-by-cylinder correction is more retarded than the optimum ignition timing. However, when the trace knock ignition timing is corrected with the cylinder-by-cylinder advancement correction amount c[i] it is unnecessary to limit the operating range as described above.

In the above-described embodiment, three correction values, or the gas-blow correction value B[i], the overheat prevention correction value C[i], and the dither control correction value D[i] are employed as the cylinder-by-cylinder correction values in order to cause differences among the air-fuel ratios of the cylinders. Instead, one or two of the correction values may be omitted. Furthermore, in order to cause differences among the air-fuel ratios of the cylinders #1 to #4, correction values other than these may be employed as the cylinder-by-cylinder correction value for which a value is set for each cylinder.

The electronic control unit 21 is not limited to one that performs software processing on all processes executed by itself. For example, the electronic control unit 21 may include at least part of the processes executed by the software in the present embodiment as one that is executed by hardware circuits dedicated to execution of these processes (such as ASIC). That is, the electronic control unit 21 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An engine controller, comprising:
a fuel injection corrector configured to perform a cylinder-by-cylinder correction of a fuel injection amount so as to cause differences among air-fuel ratios of air-fuel mixture burned in a plurality of cylinders,
wherein in a case in which the cylinder-by-cylinder correction of the fuel injection amount results in a cylinder in which combustion is performed at an air-fuel ratio richer than an output air-fuel ratio, the output air-fuel ratio being an air-fuel ratio at which combustion torque is maximized, the fuel injection corrector is configured to perform a cylinder-by-cylinder correction of ignition timing such that the ignition timing of the cylinder in which combustion is performed at the air-fuel ratio richer than the output air-fuel ratio becomes more advanced than the ignition timing of other cylinders.

2. The engine controller according to claim 1, wherein the fuel injection corrector is configured to perform the cylinder-by-cylinder correction of the ignition timing on condition that an engine is operating within an operation region in which a trace knock ignition timing in a state in which the cylinder-by-cylinder correction of the fuel injection amount is not performed is more retarded than an optimum ignition timing.

3. The engine controller according to claim 1, wherein the fuel injection corrector is configured to perform the cylinder-by-cylinder correction of the fuel injection amount such that an air-fuel ratio of an entire engine becomes a stoichiometric air-fuel ratio.

4. The engine controller according to claim 1, wherein the cylinder-by-cylinder correction of the fuel injection amount includes a gas-blow correction, which is a cylinder-by-cylinder correction of the fuel injection amount for compensating for a steady air-fuel ratio deviation caused by fluctuations of an intensity of exhaust gas blow on an air-fuel sensor arranged in an exhaust passage of an engine from respective cylinders.

5. The engine controller according to claim 1, wherein the cylinder-by-cylinder correction of the fuel injection amount includes a catalyst overheat prevention correction, which is a cylinder-by-cylinder correction of the fuel injection amount for limiting a temperature rise of a catalyst device arranged in an exhaust passage of an engine.

6. The engine controller according to claim 1, wherein the cylinder-by-cylinder correction of the fuel injection amount includes a dither control correction, which is a cylinder-by-cylinder correction of the fuel injection amount for promoting a temperature rise of a catalyst device arranged in an exhaust passage of an engine.

7. An engine controller, comprising:
a fuel injection corrector configured to perform a cylinder-by-cylinder correction of a fuel injection amount so as to cause differences among air-fuel ratios of air-fuel mixture burned in a plurality of cylinders,
wherein fuel injection corrector includes circuitry that is configured such that, in a case in which the cylinder-by-cylinder correction of the fuel injection amount results in a cylinder in which combustion is performed at an air-fuel ratio richer than an output air-fuel ratio, the output air-fuel ratio being an air-fuel ratio at which combustion torque is maximized, the circuitry performs a cylinder-by-cylinder correction of ignition timing such that the ignition tuning of the cylinder in which combustion is performed at the air-fuel ratio richer than the output air-fuel ratio becomes more advanced than the ignition timing of other cylinders.

8. An engine controlling method, comprising:
performing a cylinder-by-cylinder correction of a fuel injection amount so as to cause differences among air-fuel ratios of air-fuel mixture burned in a plurality of cylinders; and
in a case in which the cylinder-by-cylinder correction of the fuel injection amount results in a cylinder in which combustion is performed at an air-fuel ratio richer than an output air-fuel ratio, which is an air-fuel ratio at which combustion torque is maximized, performing a cylinder-by-cylinder correction of ignition timing such that the ignition timing of the cylinder in which combustion is performed at the air-fuel ratio richer than the output air-fuel ratio becomes more advanced than the ignition timing of other cylinders.

9. The engine controller according to claim 1, wherein the engine controller is configured to determine the case in which the cylinder-by-cylinder correction of the fuel injection amount results in the cylinder in which combustion is performed at the air-fuel ratio richer than the output air-fuel ratio when an engine load is greater than a predetermined engine load in which a trace knock ignition timing coincides with an optimum ignition timing.

10. The engine controller according to claim 7, wherein the engine controller is configured to determine the case in which the cylinder-by-cylinder correction of the fuel injection amount results in the cylinder in which combustion is performed at the air-fuel ratio richer than the output air-fuel ratio when an engine load is greater than a predetermined engine load in which a trace knock ignition timing coincides with an optimum ignition timing.

11. The engine controlling method according to claim 8, further comprising determining the case in which the cylinder-by-cylinder correction of the fuel injection amount results in the cylinder in which combustion is performed at the air-fuel ratio richer than the output air-fuel ratio when an engine load is greater than a predetermined engine load in which a trace knock ignition timing coincides with an optimum ignition timing.

* * * * *